US011042365B2

(12) United States Patent
Li et al.

(10) Patent No.: US 11,042,365 B2
(45) Date of Patent: Jun. 22, 2021

(54) FIRMWARE UPDATING METHOD AND ELECTRONIC DEVICE USING THE SAME

(71) Applicant: PEGATRON CORPORATION, Taipei (TW)

(72) Inventors: Kun-Yu Li, Taipei (TW); Chang-Chen Yao, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 110 days.

(21) Appl. No.: 16/186,308

(22) Filed: Nov. 9, 2018

(65) Prior Publication Data
US 2019/0235853 A1 Aug. 1, 2019

(30) Foreign Application Priority Data

Jan. 26, 2018 (TW) .................. 107102820

(51) Int. Cl.
*G06F 8/65* (2018.01)
*G06F 8/654* (2018.01)
(52) U.S. Cl.
CPC .............. *G06F 8/65* (2013.01); *G06F 8/654* (2018.02)
(58) Field of Classification Search
CPC ................... G06F 8/65; G06F 8/654
See application file for complete search history.

(56) References Cited

U.S. PATENT DOCUMENTS

| 5,317,706 A * | 5/1994 | Pechter | G06F 12/0653 711/2 |
| 7,231,504 B2 * | 6/2007 | Kashyap | G06F 9/5072 711/173 |
| 7,783,763 B2 * | 8/2010 | Tuel | H04L 67/1002 709/228 |
| 8,566,546 B1 * | 10/2013 | Marshak | G06F 11/3409 711/165 |
| 8,909,900 B2 * | 12/2014 | Dolgunov | G06F 11/1415 711/209 |
| 8,910,868 B1 * | 12/2014 | Wade | G06Q 20/3223 235/449 |
| 8,924,952 B1 * | 12/2014 | Hou | G06F 8/65 717/172 |
| 9,003,157 B1 * | 4/2015 | Marshak | G06F 3/061 711/173 |
| 9,715,443 B2 * | 7/2017 | Niu | G06F 9/5061 |
| 9,729,698 B2 * | 8/2017 | Gandhi | H04M 3/42144 |
| 10,489,145 B2 * | 11/2019 | Shivanna | H04L 67/34 |

(Continued)

*Primary Examiner* — Douglas M Slachta
(74) *Attorney, Agent, or Firm* — J.C. Patents

(57) ABSTRACT

A firmware updating method applicable to an electronic device is provided. The electronic device comprises a non-volatile memory comprising a firmware partition and a spare partition. The firmware updating method comprises: executing an auxiliary firmware, wherein the firmware partition comprises a first block and a second block, and the auxiliary firmware is in the first block and comprises a disk partition table of the non-volatile memory; receiving a system update file corresponding to a system firmware of the electronic device; and when a storage space required by the system firmware is larger than an available storage space, writing the system firmware into the second block of the firmware partition and a spare block of the spare partition according to the disk partition table and the system update file.

14 Claims, 6 Drawing Sheets

(56) References Cited

U.S. PATENT DOCUMENTS

| | | | |
|---|---|---|---|
| 2006/0075204 A1* | 4/2006 | Kumar | G06F 9/5016 711/173 |
| 2008/0244598 A1* | 10/2008 | Tolopka | G06F 21/74 718/104 |
| 2008/0263348 A1* | 10/2008 | Zaltsman | G06F 8/63 713/2 |
| 2009/0125700 A1* | 5/2009 | Kisel | G06F 12/08 711/173 |
| 2010/0325622 A1* | 12/2010 | Morton | G06F 8/654 717/168 |
| 2011/0004871 A1* | 1/2011 | Liu | G06F 8/65 717/173 |
| 2011/0131447 A1* | 6/2011 | Prakash | G06F 21/572 714/19 |
| 2011/0145807 A1* | 6/2011 | Molinie | G06F 8/65 717/170 |
| 2012/0054734 A1* | 3/2012 | Andrews | G06F 8/65 717/171 |
| 2012/0304165 A1* | 11/2012 | Bechtel | G06F 8/60 717/174 |
| 2014/0089626 A1* | 3/2014 | Schluessler | G06F 9/45558 711/170 |
| 2015/0082014 A1* | 3/2015 | Funaki | G06F 3/0619 713/2 |
| 2018/0095693 A1* | 4/2018 | Kikkawa | G06F 3/0614 |
| 2018/0160006 A1* | 6/2018 | Shimamoto | G06F 12/0638 |
| 2019/0042278 A1* | 2/2019 | Pirvu | G06F 8/654 |

* cited by examiner

FIRMWARE UPDATING METHOD AND ELECTRONIC DEVICE USING THE SAME

CROSS-REFERENCE TO RELATED APPLICATION

This application claims the priority benefit of Taiwan application serial no. 107102820, filed on Jan. 26, 2018. The entirety of the above-mentioned patent application is hereby incorporated by reference herein and made a part of this specification.

BACKGROUND

Technology Field

The disclosure relates to a firmware updating method and an electronic device using the same.

Description of Related Art

Conventionally, when a system firmware is updated, if a size of the new system firmware exceeds a memory partition space originally reserved for the system firmware in a memory, a disk partition table has to be adjusted to enlarge the memory partition space reserved for the system firmware. In order to adjust the disk partition table, a bootloader has to be updated. However, during a process of updating the bootloader, once uncertain factors such as power outage is occurred to result in a fact that the bootloader being updated is not yet fully written, the system will not boot properly. Therefore, when a user performs the system firmware updating at a remote end, updating of the bootloader can be extremely risky. Such risk is equivalent to limiting the size of the new system firmware, which generally causes considerable inconvenience to a system practitioner.

SUMMARY

The disclosure is directed to a firmware updating method and an electronic device using the same, which are adapted to make a full use of an unused disk space without updating a bootloader.

An embodiment of the disclosure provides a firmware updating method applicable to an electronic device. The electronic device comprises a non-volatile memory, and the non-volatile memory comprises a firmware partition and a spare partition. The firmware updating method comprises: executing an auxiliary firmware, where the firmware partition comprises a first block and a second block, and the auxiliary firmware is in the first block and comprises a disk partition table of the non-volatile memory; receiving a system update file corresponding to a system firmware of the electronic device; and when a storage space required by the system firmware is larger than an available storage space of the second block, writing the system firmware into the second block of the firmware partition and a spare block of the spare partition according to the disk partition table and the system update file.

An embodiment of the disclosure provides an electronic device comprising a communication element, a non-volatile memory and a controller. The communication element is configured to transmit and receive data. The non-volatile memory comprises a firmware partition and a spare partition, where the firmware partition comprises a first block and a second block, the first block comprises an auxiliary firmware, and the auxiliary firmware comprises a disk partition table of the non-volatile memory. The controller is coupled to the communication element and the non-volatile memory, and is configured to execute the auxiliary firmware, receive a system update file corresponding to a system firmware; and when a storage space required by the system firmware is larger than an available storage space of the second block, write the system firmware into the second block of the firmware partition and a spare block of the spare partition according to the disk partition table and the system update file.

According to the above, in the firmware updating method and the electronic device provided by the embodiments of the disclosure, the auxiliary firmware with a small size is installed in one of the memory partitions, and data reading and writing is performed by striding across the memory partitions by using the auxiliary firmware. In this way, it is adapted to flexibly use different blocks in each of the memory partitions without updating a bootloader of a boot partition, so as to achieve higher memory usage efficiency.

In order to make the aforementioned and other features and advantages of the disclosure comprehensible, several exemplary embodiments accompanied with figures are described in detail below.

BRIEF DESCRIPTION OF THE DRAWINGS

The accompanying drawings are comprised to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
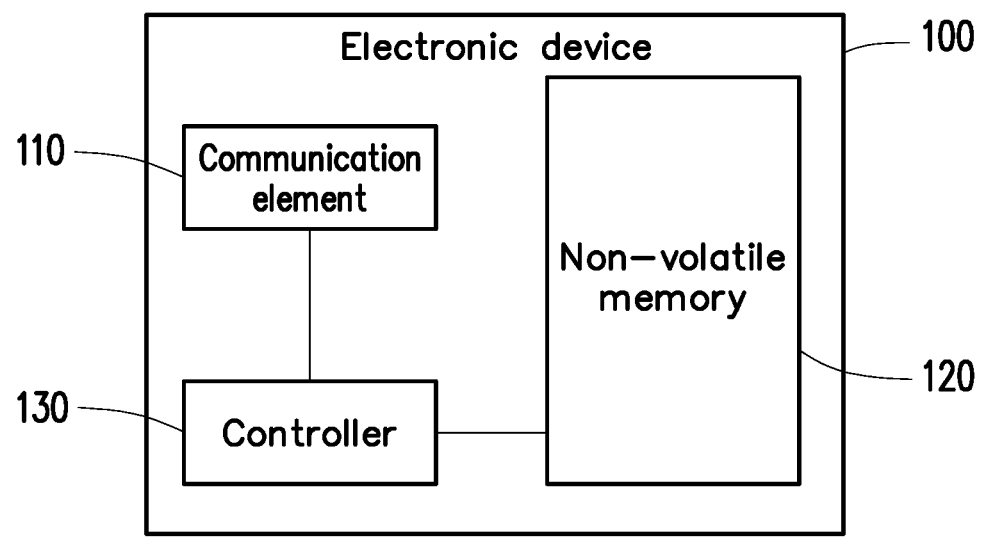
FIG. 1 is a schematic block diagram of an electronic device according to an embodiment of the invention.

A term "couple" used in the full text of the disclosure (comprising the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

In a firmware updating method of an embodiment of the invention, an auxiliary firmware with less function and less space occupation is designed, and is installed in a memory partition reserved for a system firmware. The auxiliary firmware comprises a memory partition table of the whole memory, so that after the auxiliary firmware is loaded, each of the memory partitions of the whole memory may be accessed by using the memory partition table in the auxiliary firmware. In this way, after the system firmware is downloaded, even if it is discovered that a space of the memory partition reserved for the system firmware is inadequate, other partitions of the memory may be used according to the auxiliary firmware to install the system firmware by striding across partitions, and load the system firmware by striding across the partitions. Particularly, the auxiliary firmware of an embodiment of the invention may have a function to create a connection with an external host, such that data may be transmitted and received when the auxiliary firmware is executed alone.

FIG. 1 is a schematic block diagram of an electronic device according to an embodiment of the invention. Referring to FIG. 1, the electronic device 100 of the embodiment comprises a communication element 110, a non-volatile memory 120 and a controller 130, where the controller 130 is coupled to the communication element 110 and the non-volatile memory 120. In the following embodiment, the electronic device 100 is, for example, a cable modem, though the invention is not limited thereto. In other embodiments, the electronic device 100 may also be an electronic device having a non-volatile memory for installing firmware such as a smart phone, a tablet PC, a Personal Digital Assistant (PDA), etc.

In the embodiment, the communication element 110 is configured to establish a connection with an external host (for example, a remote host used for providing a firmware update file to the electronic device to update the firmware) through a two-way coaxial cable, so as to transmit and receive data. However, the invention is not limited thereto. In other embodiments, the communication element 110 may also establish the connection with the external host through wired telephone line, optical fiber or wireless Wi-Fi, Bluetooth, etc.

In the embodiment, the non-volatile memory 120 is, for example, a flash memory used for storing data. Each of memory partitions in the non-volatile memory 120 of the embodiment and a using method thereof are described in detail below. However, the non-volatile memory 120 of the invention is not limited to be a flash memory, and those skilled in the art may implement the non-volatile memory 120 according to an actual requirement, which is not repeated.

In the embodiment, the controller 130 is configured to control a whole operation of the electronic device 100, and the controller 130 is, for example (but not limited to), a Central Processing Unit (CPU), or a programmable general purpose or special purpose microprocessor, a Digital Signal Processor (DSP), a programmable controller, an Application Specific Integrated Circuits (ASIC), a Programmable Logic Device (PLD), or other similar device or a combination of the above devices.

Figure 2:
FIG. 2 to FIG. 4 are schematic diagrams of a non-volatile memory according to an embodiment of the invention.
Figure 2:
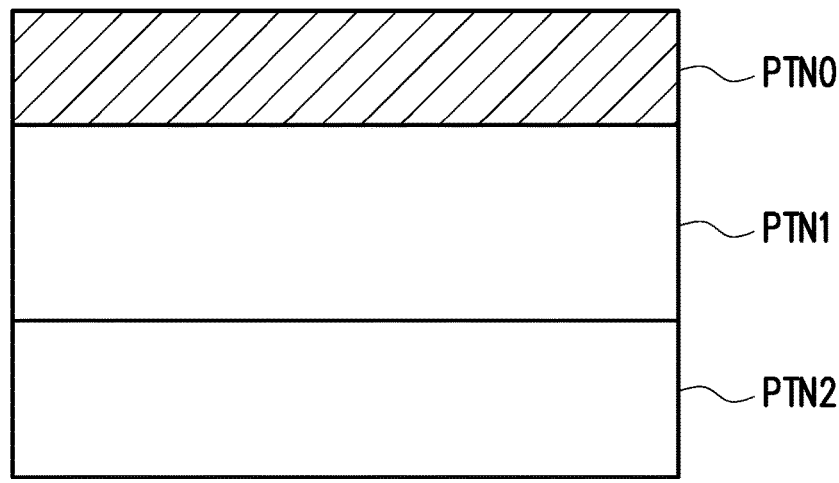
Figure 3:
Figure 3:
Figure 3:
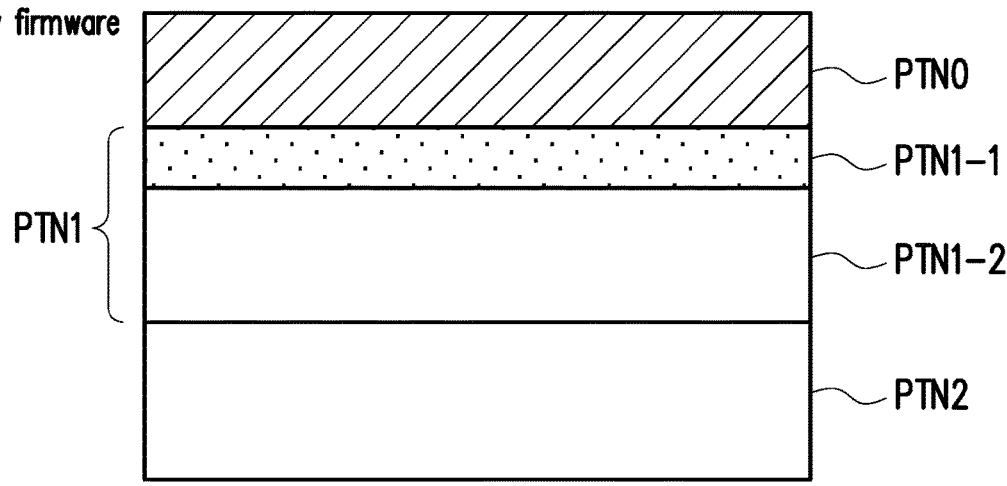
Figure 4:
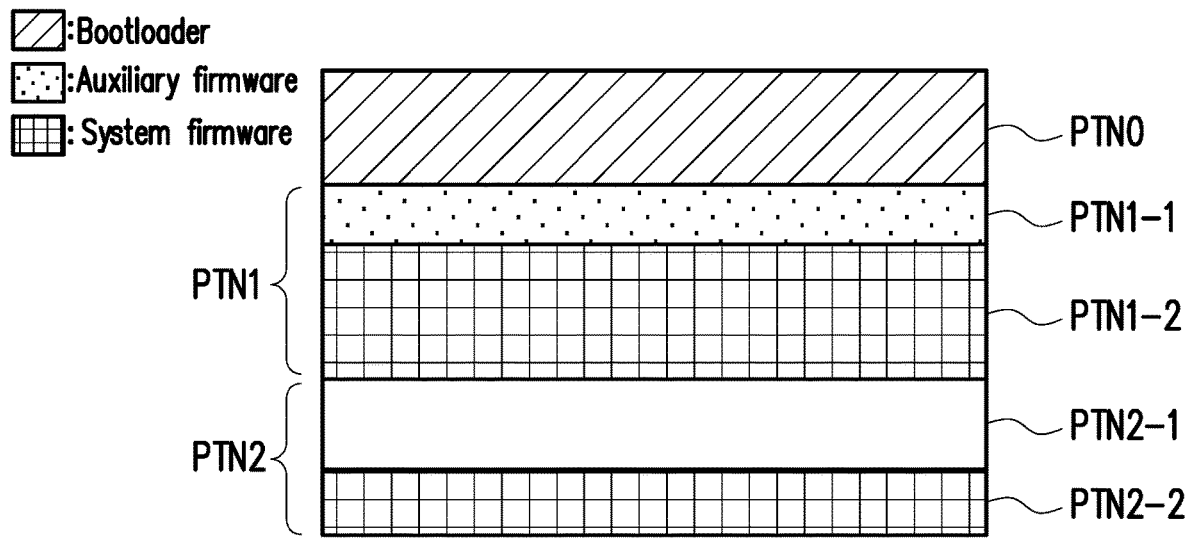
Figure 4:
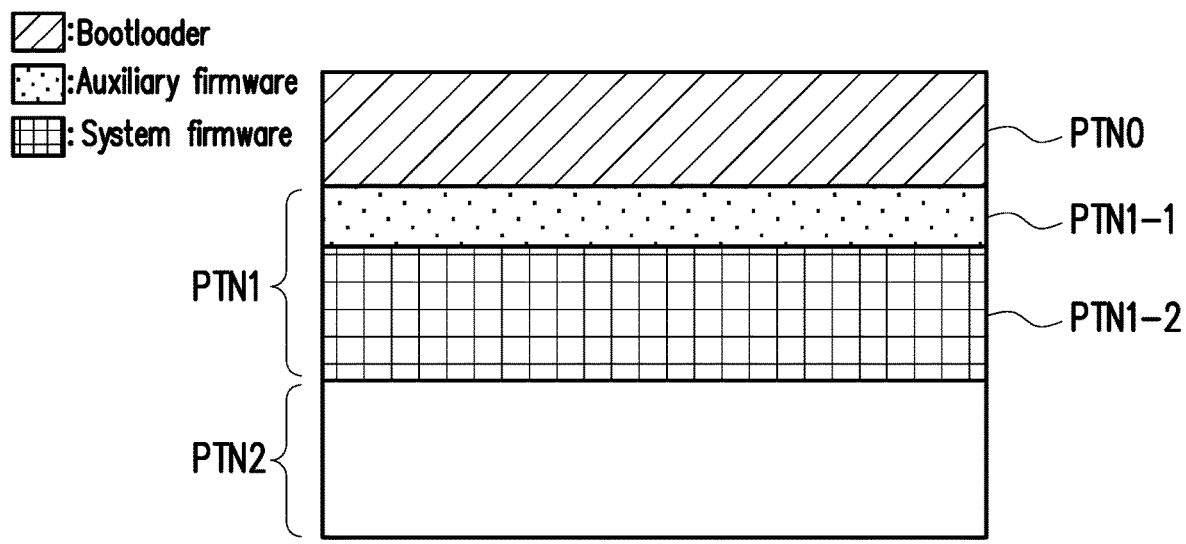

FIG. 2 to FIG. 4 are schematic diagrams of the non-volatile memory according to an embodiment of the invention. Referring to FIG. 2 to FIG. 4, in the embodiment, for simplicity's sake, the non-volatile memory 120 is illustrated as non-volatile memories 120a, 120b, 120c and 120d, which are respectively used for representing different states of the non-volatile memory 120 in the firmware updating method of the invention. The firmware updating method of the invention is introduced below with reference of the non-volatile memories 120a, 120b, 120c and 120d.

Referring to FIG. 2, in an embodiment, before a firmware update instruction is received, the non-volatile memory 120 of the electronic device 100 operates in a state of the non-volatile memory 120a. The non-volatile memory 120a comprises a boot partition PTN0, at least one firmware partition PTN1 and at least one spare partition that are not overlapped with each other.

The boot partition PTN0 records a bootloader, and the bootloader records a disk partition table. The disk partition table is, for example, used for providing a function of accessing each of the memory partitions by the electronic device. After the electronic device 100 is booted or rebooted, the bootloader is loaded to load a firmware from one of the memory partitions and execute the same according to the disk partition table. In this way, the electronic device 100 may be normally booted.

The firmware partition PTN1 is a memory partition (for example, but is not limited to, a memory partition from which the bootloader instructs the controller 130 to load the firmware) of the non-volatile memory 120 originally reserved for a system firmware. In general, after the electronic device 100 is booted or rebooted, the bootloader may instruct to select the firmware partition PTN1 to load and execute the system firmware recorded therein. In this way, the electronic device 100 may normally operate (for example, to establish a connection with the external host) after booting.

The spare partition PTN2, for example (but is not limited to), comprises a fixed data block and a spare block. The fixed data block is used for recording verification information required by the electronic device 100 for transmitting data, or hardware information of the electronic device 100 itself, etc., which is not limited by the invention. The spare block is, for example, reserved and unused block.

Referring to FIG. 3, in the embodiment, during the process that the electronic device 100 executes the system firmware, the electronic device 100, for example, receives a firmware update instruction from the external host, and receives an auxiliary firmware update file corresponding to an auxiliary firmware. Therefore, the controller 130 of the electronic device 100 writes the auxiliary firmware into the firmware partition PTN1 according to the received auxiliary firmware update file, and then reboots the electronic device 100. Now, the state of the non-volatile memory 120 is shown as the non-volatile memory 120b of FIG. 3, and the original system firmware in the firmware partition PTN1 is overwritten by the auxiliary firmware and cannot be executed. In the embodiment, a part of the firmware partition PTN1 occupied by the auxiliary firmware is referred to as a first block PTN1-1, and the other part of the firmware partition PTN1 is referred to as a second block PTN1-2.

It should be noted that in another embodiment, a manufacturer of the electronic device 100, for example, writes the bootloader in the boot partition PTN0 before delivery of the electronic device 100, and writes the auxiliary firmware in the firmware partition PTN1, such that the electronic device 100 is already in the state of the non-volatile memory 120b after delivery.

Particularly, the auxiliary firmware provided by the embodiment of the invention comprises the disk partition table to make the electronic device 100 to access data according to the memory partition storing the data, which comprises accessing data by striding across different memory partitions. Moreover, the auxiliary memory further has a connection function of Data-Over-Cable Service Interface Specifications (DOCSIS), which is adapted to establish a connection with the external host according to the DOCSIS specifications to transmit and receive data.

After the electronic device 100 is rebooted in the state of the non-volatile memory 120b, the bootloader of the boot partition PTN0 may instruct to select the firmware partition PTN1 to perform reading. In the embodiment, the auxiliary firmware in the first block PTN1-1 is loaded and executed, such that the electronic device establishes a connection with the external host through the DOCSIS specifications.

In an embodiment, during the process of executing the auxiliary firmware, the electronic device 100 may further receive the firmware update instruction from the external host, and receive the auxiliary firmware update file corresponding to the auxiliary firmware. In this way, the controller 130 of the electronic device 100 may write the auxiliary firmware in the firmware partition PTN1 according to the received auxiliary firmware update file, so as to overwrite and update the auxiliary firmware, and then reboots the electronic device 100.

It should be noted that functions of the auxiliary firmware are less than that of the system firmware, so that a storage space required by the auxiliary firmware is not greater than an available storage space of the first block PTN1.

Referring to FIG. 4, in another embodiment, during the process of executing the auxiliary firmware, the electronic device 100 may further receive the firmware update instruction from the external host, and receive a system update file corresponding to the system firmware of the electronic device 100.

If a storage space required by the system firmware corresponding to the system update file is larger than an available storage space of the second block PTN1-2, the controller 130 of the electronic device 100 may write the system firmware into the second block PTN1-2 of the firmware partition PTN1 and the spare partition PTN2 according to the disk partition table of the auxiliary firmware and the system update file based on the received system update file. After the system firmware is successfully updated, the state of the non-volatile memory 120 is shown as the non-volatile memory 120c of FIG. 4. In the embodiment, the part of the spare partition PTN2 used for writing the system firmware is referred to as a spare block PTN2-2, and the other part of the spare partition PTN2 is referred to as a fixed data block PTN2-1. In this way, when the non-volatile memory 120 is in the state of the non-volatile memory 120c of FIG. 4, the auxiliary firmware of the first block PTN1-1 of the firmware partition PTN1 may be normally executed. Moreover, the system firmware recorded by striding across two partitions and located in both of the second block PTN1-2 of the firmware partition PTN1 and the spare block PTN2-2 of the spare partition PTN2 may also be normally executed.

On the other hand, if the storage space required by the system firmware corresponding to the system update file is not larger than the available storage space of the second block PTN1-2, the controller 130 of the electronic device 100 may write the system firmware into the second block PTN1-2 of the firmware partition PTN1 according to the disk partition table of the auxiliary firmware and the system update file based on the received system update file. After the system firmware is successfully updated, the state of the non-volatile memory 120 is shown as the non-volatile memory 120d of FIG. 4. In this way, when the non-volatile memory 120 is in the state of the non-volatile memory 120d of FIG. 4, the auxiliary firmware of the first block PTN1-1 of the firmware partition PTN1 may be normally executed. Moreover, the system firmware of the second block PTN1-2 of the firmware partition PTN1 may also be normally executed.

It should be noted that even if updating of the system firmware is failed, since the auxiliary firmware of the first block PTN1-1 of the firmware partition PTN1 may still be normally executed, after the electronic device 100 is rebooted, the auxiliary firmware in the first block PTN1-1 of the firmware partition PTN1 may still be executed according to the aforementioned flow to again connect the external host, and re-download the system update file to re-update the system firmware.

In an embodiment, the fixed data block PTN2-1 is used for recording verification information required by the electronic device 100 for transmitting data, or hardware information of the electronic device 100 itself, though the invention is not limited thereto. For example, information such as Certificate Authority (CA) authentication code, Cable Modem (CM) authentication code, CM publish key, etc., required when the electronic device 100 establishes the connection with the external host through the DOCSIS may be recorded in the fixed data block PTN2-1, though the invention is not limited thereto.

It should be noted that in an embodiment, besides that the system firmware corresponding to the system update file provided by the external host has functions of the normal system firmware, it also comprises the disk partition table, such that when the electronic device 100 executes the system firmware, the electronic device 100 may access data according to the memory partitions where the data is located, which also comprises accessing data by striding across different memory partitions. Moreover, the system firmware corresponding to the system update file provided by the external host also has the DOCSIS connection function, which is adapted to establish connection with the external host through the DOCSIS specifications to transmit and receive data. In this way, when the non-volatile memory 120 has a plurality of similar firmware partitions PTN1, the electronic device 100 may also select one of the firmware partitions PTN1 and one spare partition PTN2 to update the system firmware through the disk partition table of the running system firmware, so as to write or install the system firmware to the selected firmware partitions PTN1 and the spare partition PTN2.

Figure 5:
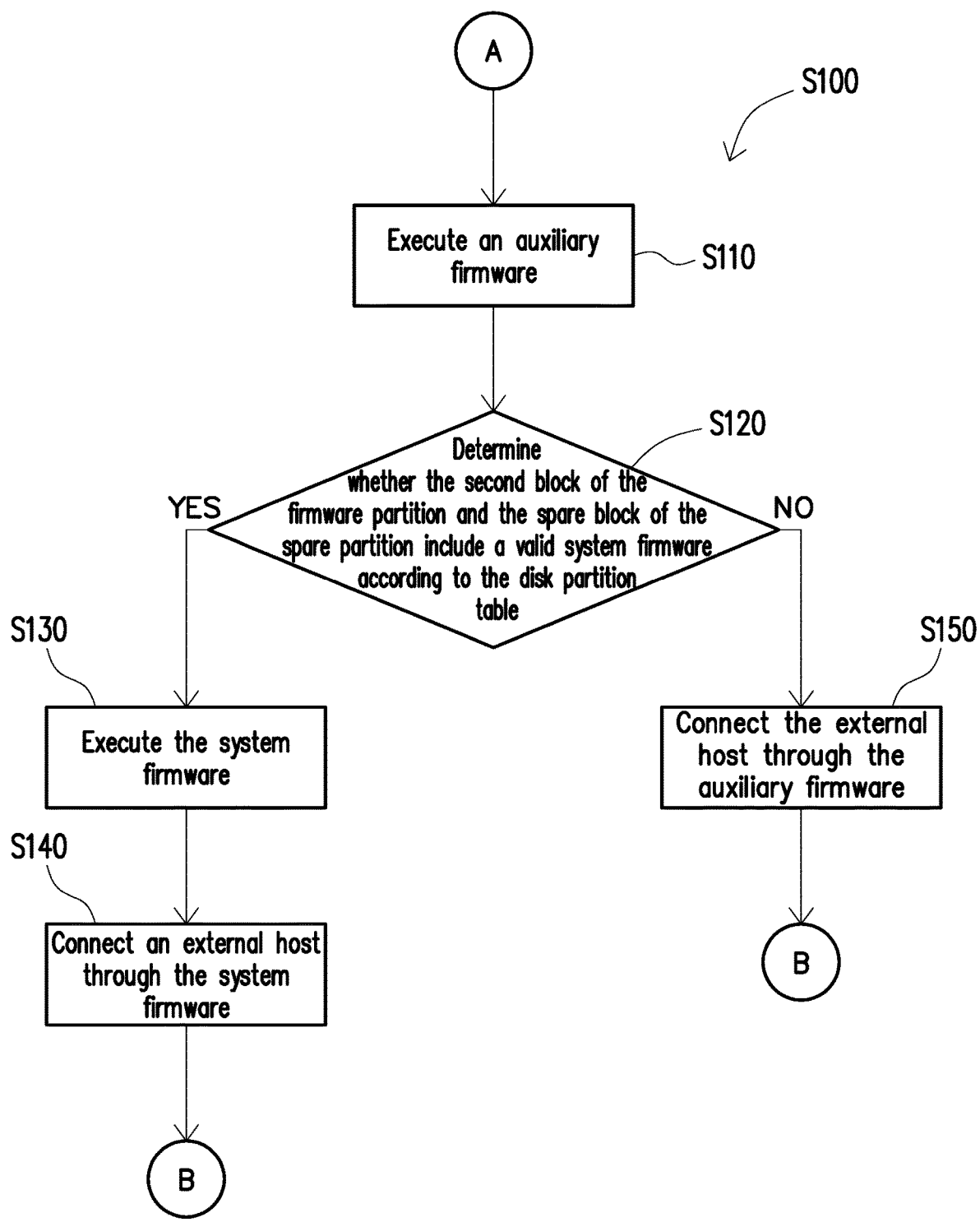
FIG. 5 to FIG. 7 are flowcharts illustrating a firmware updating method according to an embodiment of the invention.
Figure 6:
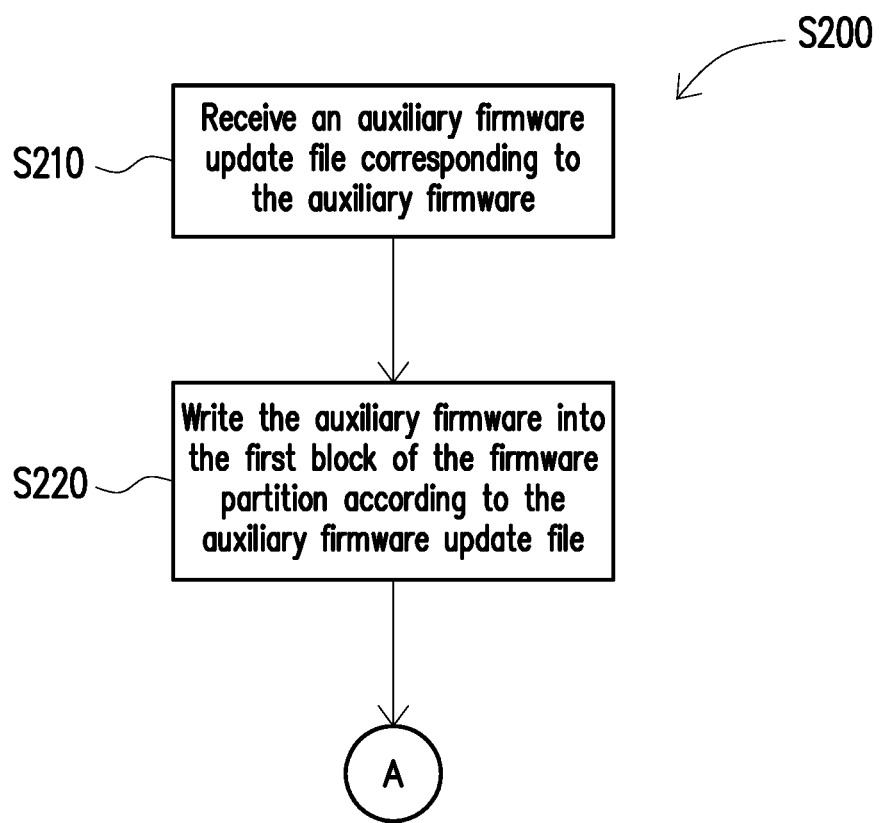
Figure 7:
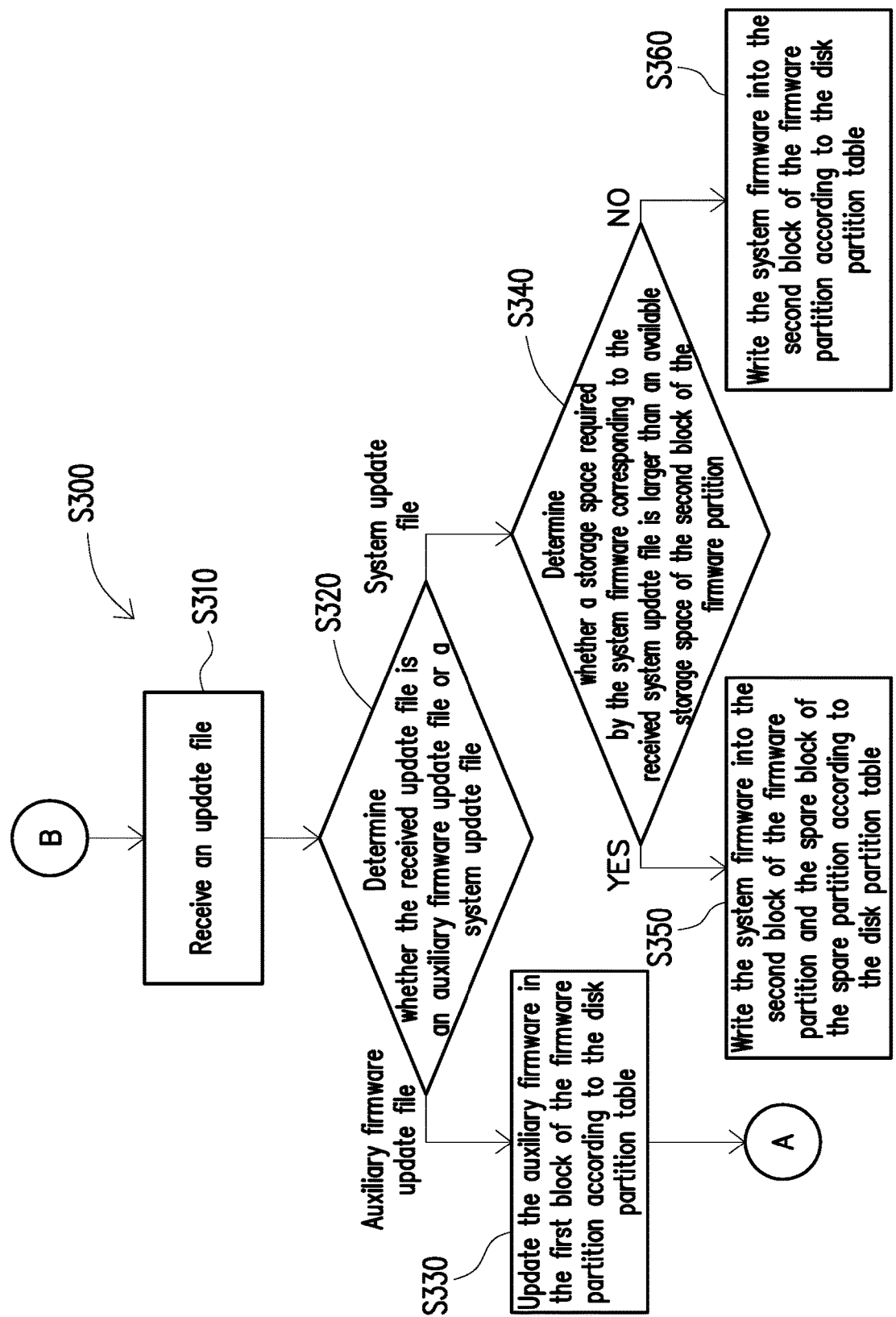

FIG. 5 to FIG. 7 are flowcharts illustrating a firmware updating method according to an embodiment of the invention. Various steps comprised in flows S100, S200 and S300 respectively illustrated in FIG. 5 to FIG. 7 are adapted to various components of the electronic device 100 in FIG. 1 to FIG. 4, and details thereof are described below with reference of various components and referential numbers thereof in FIG. 1 to FIG. 4. It should be noted that implementation details of each of the steps described above are not repeated in following description.

In an embodiment, the non-volatile memory 120 of the electronic device 100, for example, does not record the auxiliary firmware, the flow S200 of FIG. 6 is then first executed to write the auxiliary firmware into the first block PTN1-1 of the firmware partition PTN1.

Referring to FIG. 6, in step S210, the electronic device 100 receives an auxiliary firmware update file corresponding to the auxiliary firmware through the communication element 110. For example, the electronic device 100 initially executes the conventional system firmware, and receives the auxiliary firmware update file corresponding to the auxiliary firmware from the external host through the DOCSIS specifications. Then, in step S220, the controller 130 writes the auxiliary firmware into the first block PTN1-1 of the firmware partition PTN1 according to the auxiliary firmware update file. In an embodiment, the controller 130, for example, first defines the firmware partition PTN1 into the first block PTN-1 and the second block PTN1-2 according to the space required by the auxiliary firmware, and then writes the auxiliary firmware into the first block PTN1-1 according to the auxiliary firmware update file. The auxiliary firmware update file, for example, comprises information such as data required for installing the auxiliary firmware and the memory partition used for installing the auxiliary firmware, etc., though the invention is not limited thereto.

In an embodiment, the firmware partition PTN1 is, for example, a memory partition used for recording the system firmware that is currently executed by the electronic device 100. In another embodiment, the memory partition recording the system firmware that is currently executed by the electronic device 100 may also be a memory partition different to the firmware partition PTN1. After the auxiliary firmware is written into the first block PTN1-1 of the firmware partition PTN1, the flow S100 of FIG. 5 is executed.

In another embodiment, the first block PTN1-1 of the firmware partition PTN1 of the non-volatile memory 120b of the electronic device 100 has already recorded the auxiliary firmware, so that the flow S100 may be started without executing the flow S200.

Referring to FIG. 5, after the controller 130 boots or reboots the electronic device 100, in step S110, the controller 130 executes the auxiliary firmware. In an embodiment, the controller 130 may reboot the electronic device 100 after the flow S200 is ended, and after the electronic device 100 is rebooted, the controller 130 first loads the bootloader in the boot partition PTN0, and the bootloader may instruct to load and execute the auxiliary firmware in the first block PTN1-1 of the firmware partition PTN1. In another embodiment, the first block PTN1-1 of the firmware partition PTN1 of the non-volatile memory 120b of the electronic device 100 has already recorded the auxiliary firmware, so that after the electronic device 100 is booted, the bootloader in the boot partition PTN0 is also loaded, and the bootloader may instruct to load and execute the auxiliary firmware in the first block PTN1-1 of the firmware partition PTN1.

In step S120, the controller 130 determines whether the second block of the firmware partition and the spare block of the spare partition comprise a valid system firmware according to the disk partition table. In the embodiment, the disk partition table of the auxiliary firmware indicates the first block PTN1-1 where the disk partition table is located, the second block PTN1-2 and the spare block PTN2-2 where the system firmware is located. Therefore, the controller 130 may check the second block PTN1-2 and the spare block PTN2-2 to determine whether the valid system firmware is recorded therein. In an embodiment, the system firmware is recorded in the second block PTN1-2 and the spare block PTN2-2, so that the controller 130 may check the second block PTN1-2 and the spare block PTN2-2 to determine whether the valid system firmware is recorded therein. In another embodiment, the system firmware is only recorded in the second block PTN1-2, so that the controller 130 may check the second block PTN1-2 to determine whether the valid system firmware is recorded therein. The checking method thereof is, for example, to use checksum, though the invention is not limited thereto, and those skilled in the art may implement the checking method according to an actual requirement.

If the second block PTN1-2 and the spare block PTN2-2 record the valid system firmware (i.e. the second block PTN1-2 and the spare block PTN2-2 commonly record the system firmware or only the second block PTN1-2 records the system firmware), in step S130, the controller 130 executes the system firmware, and connects the external host through the system firmware in step S140. In an embodiment, the controller 130 may load the system firmware recorded in the second block PTN1-2 of the firmware partition PTN1 and the spare block PTN2-2 of the spare partition PTN2 by striding across two memory partitions according to the disk partition table in the auxiliary firmware, or load the system firmware only recorded in the second block PTN1-2 of the firmware partition PTN1, and execute the system firmware. Thereafter, the controller 130, for example, is connected to the external host through the DOCSIS specifications based on the DOCSIS connection function of the system firmware.

If the second block PTN1-2 and the spare block PTN2-2 do not record the valid system firmware, in step S150, the controller 130 may be connected to the external host through the auxiliary firmware. In an embodiment, the controller 130 may be directly connected to the external host through the DOCSIS specifications based on the DOCSIS connection function of the auxiliary firmware.

In the embodiment, once the electronic device 100 is connected to the external host through the DOCSIS specifications, the electronic device 100 is capable of receiving an update file from the external host to download and update or install the firmware of the electronic device, shown as the flow S300 of FIG. 7.

Referring to FIG. 7, in step S310, the electronic device 100 receives an update file through the communication element 110. In an embodiment, the electronic device 100, for example, receives a firmware update instruction and an update file from the external host through the DOCSIS specifications. The received firmware update instruction and the update file, for example, comprise a firmware type to be updated, the memory partition to be written, etc., though the invention is not limited thereto.

In step S320, the electronic device 100 determines whether the received update file is the auxiliary firmware update file or the system update file corresponding to the system firmware of the electronic device 100. In an embodiment, the firmware update instruction, for example, directly indicates that the update file is the auxiliary firmware update file or the system update file. In another embodiment, the controller 130 may also check a head file of the update file to determine whether the update file is the auxiliary firmware update file or the system update file. In other words, how the controller 130 determines whether the received update file is the auxiliary firmware update file or the system update file is not limited by the invention.

If the controller 130 determines that the received update file is the auxiliary firmware update file, in step S330, the controller 130 updates the auxiliary firmware in the first block of the firmware partition according to the disk partition table. Otherwise, if the controller 130 determines that the received update file is the system update file corresponding to the system firmware of the electronic device 100, in step S340, the controller 130 compares a storage space required by the system firmware corresponding to the received system update file with an available storage space of the second block of the firmware partition. If the storage space required by the system firmware is larger than the available storage space of the second block, in step S350, the controller 130 writes the system firmware into the second block of the firmware partition and the spare block of the spare partition according to the disk partition table. Otherwise, if the storage space required by the system firmware is not larger than the available storage space of the second block, in step S360, the controller 130 writes the system firmware into the second block of the firmware partition according to the disk partition table. Details for updating the auxiliary firmware and writing the system firmware have been described above, so that descriptions thereof are not repeated. Once updating of the firmware (for example, the auxiliary firmware or the system firmware) is completed, the controller 130 may reboot the electronic device 100 and return to the flow S200 of FIG. 6 for execution and connection.

Based on the flows S100, S200 and S300 introduced in the embodiments of FIG. 5 to FIG. 7, regardless of the state of the non-volatile memory 120 of the electronic device 100 (for example, the non-volatile memory 120a, 120b, 120c or 120d), and regardless of the auxiliary firmware or the system firmware currently executed by the electronic device 100, as long as the connection with the external host is established through the DOCSIS specifications, after the update file is received, the firmware updating may be successfully performed according to the received update file.

It should be noted that in the embodiments of the invention it is unnecessary to vary the bootloader in the boot partition PTN0, so that after the electronic device 100 is booted or rebooted, the bootloader is still loaded and executed as usual. Particularly, by using the auxiliary firmware under the original memory partition allocation in the embodiments of the invention, different blocks in each of the memory partitions are flexibly used, so as to achieve higher memory usage efficiency.

In summary, in the firmware updating method and the electronic device provided by the embodiments of the invention, the auxiliary firmware with a small size is installed in one of the memory partitions, and data reading and writing is performed by striding across the memory partitions by using the auxiliary firmware. In this way, in case that the original allocation of the memory partitions is not changed, different blocks in each of the memory partitions are flexibly used, so as to achieve higher memory usage efficiency. Moreover, in the embodiments of the invention, since the bootloader in the boot partition is not varied, and the auxiliary firmware and the updated system firmware all have the connection function, the risk in firmware updating is greatly decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A firmware updating method, applicable to an electronic device, wherein the electronic device comprises a non-volatile memory, and the non-volatile memory comprises a firmware partition and a spare partition, the firmware updating method comprising:
   executing an auxiliary firmware, wherein the firmware partition comprises a first block and a second block, and the auxiliary firmware is in the first block and comprises a disk partition table of the non-volatile memory;
   receiving a system update file corresponding to a system firmware of the electronic device; and
   when a storage space required by the system firmware is larger than an available storage space of the second block, writing the system firmware into the second block of the firmware partition and a spare block of the spare partition according to the disk partition table and the system update file,
   wherein the system firmware is stored in both the firmware partition and the spare partition without updating a bootloader.

2. The firmware updating method as claimed in claim 1, wherein when the storage space is smaller than or equal to the available storage space, the system firmware is written into the second block of the firmware partition according to the disk partition table and the system update file.

3. The firmware updating method as claimed in claim 1, wherein after the step of executing the auxiliary firmware, the method further comprises:
   loading and executing the system firmware from the second block of the firmware partition and the spare block of the spare partition according to the disk partition table.

4. The firmware updating method as claimed in claim 1, wherein the system firmware comprises the disk partition table.

5. The firmware updating method as claimed in claim 1, further comprising:
   receiving an auxiliary firmware update file corresponding to the auxiliary firmware; and
   writing the auxiliary firmware into the first block of the firmware partition according to the auxiliary firmware update file.

6. The firmware updating method as claimed in claim 1, wherein the electronic device is a cable modem, the auxiliary firmware comprises a Data-Over-Cable Service Interface Specifications (DOCSIS) connection function, and the system update file is received through the DOCSIS connection function.

7. The firmware updating method as claimed in claim 1, wherein the firmware partition and the spare partition are not overlapped to each other, and the first block and the second block are not overlapped to each other.

8. An electronic device, comprising:
   a communication element, configured to transmit and receive data;
   a non-volatile memory, comprising a firmware partition and a spare partition, wherein the firmware partition comprises a first block and a second block, the first block comprises an auxiliary firmware, and the auxiliary firmware comprises a disk partition table of the non-volatile memory; and
   a controller, coupled to the communication element and the non-volatile memory, and the controller configured to:
   execute the auxiliary firmware;
   receive a system update file corresponding to a system firmware; and
   when a storage space required by the system firmware is larger than an available storage space of the second block, write the system firmware into the second block of the firmware partition and a spare block of the spare partition according to the disk partition table and the system update file,
   wherein the system firmware is stored in both the firmware partition and the spare partition without updating a bootloader.

9. The electronic device as claimed in claim 8, wherein when the storage space is smaller than or equal to the available storage space, the controller is configured to write the system firmware into the second block of the firmware partition according to the disk partition table and the system update file.

10. The electronic device as claimed in claim 8, wherein after the controller executes the auxiliary firmware, the controller is further configured to:
    load and execute the system firmware from the second block of the firmware partition and the spare block of the spare partition according to the disk partition table.

11. The electronic device as claimed in claim 8, wherein the system firmware comprises the disk partition table.

12. The electronic device as claimed in claim 8, wherein the controller is further configured to:

receive an auxiliary firmware update file corresponding to the auxiliary firmware; and write the auxiliary firmware into the first block of the firmware partition according to the auxiliary firmware update file.

13. The electronic device as claimed in claim 8, wherein the electronic device is a cable modem, the auxiliary firmware comprises a Data-Over-Cable Service Interface Specifications (DOCSIS) connection function, and the controller receives the system update file through the DOCSIS connection function.

14. The electronic device as claimed in claim 8, wherein the firmware partition and the spare partition are not overlapped to each other, and the first block and the second block are not overlapped to each other.

* * * * *